United States Patent Office 3,475,453
Patented Oct. 28, 1969

3,475,453
PENTAFLUOROTHIOTRIFLUOROETHYLENE FUMIGANT
Everett E. Gilbert, Morristown, N.J., and Gary L. Gard, Beaverton, Oreg., assignors to Allied Chemical Corporation, New York, N.Y., a corporation of New York
No Drawing. Filed Aug. 15, 1967, Ser. No. 660,606
Int. Cl. A01n 9/12
U.S. Cl. 424—335    3 Claims

ABSTRACT OF THE DISCLOSURE

Method of fumigation whereby an effective amount of pentafluorothiotrifluoroethylene is introduced into an enclosed area. This compound is effective in combating and controlling various pest insects and their larvae.

---

As is well known, the control of pest organisms which infest hosts such as soil, grain and flour, textiles, carpeting, dwellings, warehouses, and other storage facilities is extremely difficult when the pest organisms have penetrated into the host space. The adult insects reproduce, leaving their larvae which in a short time multiply to many times the original number of pests. The use of solid or surface poisons or pesticides is effective only insofar as the pests are directly contacted by the pesticide. Liquid pesticides cannot be used for edible hosts due to the danger of contamination, and thus a vapor phase fumigant which can readily penetrate to all parts of the pest-infested space is advantageous. Various fumigants useful in the vapor phase have been proposed for controlling insect pests, but a need for new and specifically effective fumigants continues.

It is a principal object of the present invention to provide a method of combating and controlling pest insects.

It is another object to provide a pesticide effective in the vapor phase against pest insects and their larvae.

Further objects will become apparent from the following detailed description thereof.

It has been discovered that pentafluorothiotrifluoroethylene is an effective pesticide against common pests which infest grain, flour, carpets, and the like.

Pentafluorothiotrifluoroethylene is a known compound having the formula $$SF_5CF=CF_2$$

It has been described in U.S. Patent 3,131,217, issued to Ray on Apr. 28, 1964. This compound is a colorless liquid having a boiling point of 19° C., and thus it vaporizes at about room temperature.

According to the process of this invention, pests are contacted with an atmosphere containing an effective concentration of pentafluorothiotrifluoroethylene vapor. The process of the invention is particularly applicable to combating pest infestation of stored products, such as grain, flour, and the like, which fill an enclosed space. Pentafluorothiotrifluoroethylene is effective not only against adult pests, either killing them outright or paralyzing them so they cannot propagate, but against their larvae as well, which are more difficult to screen out of a given quantity of grain, flour, fibers, and the like.

In carrying out the process of the present invention, the pests are subjected to an effective concentration of pentafluorothiotrifluoroethylene in accordance with any of the methods known to one skilled in the art. The compound as described above is introduced into the space to be treated so that its vapors can diffuse and permeate the space. It can be introduced into the area to be treated as a liquid and allowed to penetrate the area by evaporation. Alternatively, the compound can be admixed with a diluent inert gas or gaseous mixture. As an illustration, air can be bubbled into the pentafluorothiotrifluoroethylene and the resultant vapor-laden air stream passed into the area to be fumigated. The pentafluorothiotrifluoroethylene can also be admixed with a suitable propellant mixture and sprayed into the area, dissolving it in a suitable solvent if required.

In general, a dosage of about 0.2 to about 2.0 pounds of fumigant per 1000 cu. ft. of space will be required to permeate an area and insure effective pest control. The exposure time required depends upon the volume of space to be sterilized and the type of host to be penetrated. In an area of about 1000 cu. ft. the time required can vary from several hours to several days. Any residual fumigant can be readily dissipated by aeration.

The effectiveness of pentafluorothiotrifluoroethylene as a fumigant can be illustrated by the tests and results given below.

Test insects were placed in 1.5-inch diameter salve tins with perforated lids containing a small amount of food (grain, flour, ground dog food, etc.) and placed in a one-gallon jar. Pentafluorothiotrifluoroethylene was added so that its concentration in the jar was one pound per 1000 cu. ft. and the jar sealed. After twenty-four hours the insect containers were removed and mortality counts were made at one-day intervals. After five days 100 percent mortality was observed for black carpet beetle larvae (*Attagenus piceus*); 20 percent adult lesser mealworms (*Alphitobium diaperinus*) were killed and the rest paralyzed; and 100 percent of adult confused flour beetles (*Tribolium confusum*) were paralyzed.

While the invention has been described with particular reference to specific embodiments thereof, various changes and differences will be apparent to one skilled in the art, and the invention is not meant to be limited to the details described herein.

We claim:
1. A method of killing pest insects and their larvae which comprises contacting said insects and their larvae with a killing amount of pentafluorothiotrifluoroethylene.
2. A method of paralyzing pest insects and their larvae which comprises contacting said insects and their larvae with a paralyzing amount of pentafluorothiotrifluoroethylene.
3. The method of claim 1 or 2, wherein the insects and their larvae are contacted with an atmosphere containing from about 0.2 to about 2.0 pounds of pentafluorothiotrifluoroethylene vapor per one thousand cubic feet of space.

References Cited

UNITED STATES PATENTS

| | | | |
|---|---|---|---|
| 3,086,048 | 4/1963 | Ray et al. | 260—543 |
| 3,131,217 | 4/1964 | Ray | 260—543 |
| 3,228,981 | 1/1966 | Tullock | 260—543 |

ALBERT T. MEYERS, Primary Examiner

HOWARD M. ELLIS, Assistant Examiner